(12) United States Patent
Schattenmann et al.

(10) Patent No.: US 7,514,518 B2
(45) Date of Patent: Apr. 7, 2009

(54) PROCESS FOR CONTINUOUSLY PREPARING LOW-ALKOXY SILICONE RESINS

(75) Inventors: Wolfgang Schattenmann, Burghausen (DE); Georg Loher, Braunau (AT); Thomas Koehler, Kastl (DE)

(73) Assignee: Wacker Chemie AG, Munich (DE)

( * ) Notice: Subject to any disclaimer, the term of this patent is extended or adjusted under 35 U.S.C. 154(b) by 440 days.

(21) Appl. No.: 11/333,713

(22) Filed: Jan. 17, 2006

(65) Prior Publication Data

US 2006/0167202 A1    Jul. 27, 2006

(30) Foreign Application Priority Data

Jan. 27, 2005    (DE)    ........................ 10 2005 003 899

(51) Int. Cl.
C08G 77/06    (2006.01)
C08G 77/24    (2006.01)
C08G 77/00    (2006.01)

(52) U.S. Cl. .............................. 528/20; 528/42; 528/10

(58) Field of Classification Search .................. 528/42, 528/20
See application file for complete search history.

(56) References Cited

U.S. PATENT DOCUMENTS

| | | | | |
|---|---|---|---|---|
| 2,398,672 | A | * | 4/1946 | Sauer ........................... 528/12 |
| 2,470,497 | A | * | 5/1949 | Lamoreaux ................... 528/20 |
| 2,661,348 | A | | 12/1953 | Welsh et al. |
| 2,758,124 | A | | 8/1956 | Schwenker et al. |
| 3,375,223 | A | * | 3/1968 | Merrill ......................... 528/14 |
| 3,435,001 | A | * | 3/1969 | Merrill ......................... 528/14 |
| 3,450,672 | A | * | 6/1969 | Merrill ......................... 528/12 |
| 3,489,782 | A | * | 1/1970 | Vialle et al. .................. 556/415 |
| 3,668,180 | A | * | 6/1972 | Brennan et al. ............... 528/14 |
| 3,790,527 | A | * | 2/1974 | Merrill ......................... 528/12 |
| 3,792,071 | A | | 2/1974 | Nitzsche et al. |
| 3,832,319 | A | * | 8/1974 | Merrill ........................ 524/376 |
| 3,846,358 | A | * | 11/1974 | Roedel ........................ 524/773 |
| 3,925,276 | A | * | 12/1975 | Merrill ........................ 524/588 |
| 4,056,492 | A | * | 11/1977 | Merrill ......................... 528/18 |
| 4,209,454 | A | | 6/1980 | Graf et al. |
| 4,298,753 | A | | 11/1981 | Schinabeck et al. |
| 4,506,087 | A | | 3/1985 | Fischer et al. |
| 4,988,470 | A | * | 1/1991 | Demlehner et al. .......... 264/137 |
| 5,223,636 | A | | 6/1993 | Koshimura et al. |
| 5,300,607 | A | * | 4/1994 | Nakanishi et al. ............. 528/14 |
| 5,300,610 | A | * | 4/1994 | Nakanishi et al. ............. 528/14 |
| 5,861,457 | A | * | 1/1999 | Weidner et al. .............. 524/588 |
| 6,069,220 | A | * | 5/2000 | Hoffmann et al. ............. 528/12 |
| 6,107,505 | A | * | 8/2000 | Yoshida et al. ............... 556/450 |
| 6,197,914 | B1 | * | 3/2001 | Kaeppler et al. ............... 528/32 |
| 6,232,423 | B1 | * | 5/2001 | Kohler et al. .................. 528/12 |
| 6,281,285 | B1 | * | 8/2001 | Becker et al. ................ 524/837 |
| 6,313,045 | B1 | * | 11/2001 | Zhong et al. ................. 438/758 |
| 6,395,825 | B1 | * | 5/2002 | Becker et al. ................ 524/837 |
| 6,767,982 | B2 | | 7/2004 | Standke et al. |
| 2007/0078277 | A1 | * | 4/2007 | Ackermann ................. 556/470 |

FOREIGN PATENT DOCUMENTS

| | | |
|---|---|---|
| DE | 854 708 | 11/1952 |
| DE | 953 661 | 12/1956 |
| DE | 954 198 | 12/1956 |
| DE | 1 302 773 | 8/1972 |
| DE | 24 15 331 | 10/1975 |
| DE | 19507594 A1 * | 9/1996 |
| DE | 10146390 A1 * | 6/2002 |
| GB | 1192506 | 5/1970 |
| JP | 5125188 | 5/1993 |
| JP | 8253588 | 10/1996 |

OTHER PUBLICATIONS

Certified English-language translation of DE-19507594, 17 pages. Translation made in Jun. 2008.*
Abstract Corresponding to DE 854 708, 1952.
Derwent Abstract Corresponding to DE 1 302 773, 1972.
Derwent Abstract Corresponding to DE 24 15 331, 1975.
US 2,758,124 is Corresponding to DE 954 198, 1956.
US 2,661,348 is Corresponding to DE 952 661, 1956.
Patbase Abstract corresponding to JP 8-253588, Oct. 1, 1996.
Patbase Abstract corresponding to JP 5-125188, May 21, 1993.
Abstract Corresponding to DE 854 708, Nov. 6, 1952.
Derwent Abstract Corresponding to DE 1 302 773, Aug. 31, 1972.
Derwent Abstract Corresponding to DE 24 15 331, Oct. 16, 1975.
US 2,758,124 is Corresponding to DE 954 198, Dec. 13, 1956.
US 2,661,348 is Corresponding to DE 952 661, Dec. 6, 1956.

* cited by examiner

Primary Examiner—Randy Gulakowski
Assistant Examiner—Robert Loewe
(74) Attorney, Agent, or Firm—Brooks Kushman P.C.

(57) ABSTRACT

The present invention relates to a process for preparing organopolysiloxanes by reacting halosilane with alcohol and water in the presence of the desired organopolysiloxane in a reaction unit comprising a distillation column, optionally a reflux condenser, and a vessel already containing desired organopolysiloxane, by heating the vessel contents to boiling under reflux, introducing halosilane into the column above the lower column end, removing hydrogen halide from the distillation column and continuously removing organopolysiloxane from the vessel at the same rate in which it is formed, by constantly adding halosilane, alcohol and water to the reaction unit in such amounts that more water is always present in the reaction unit than is consumed by the added Si-halogen units of the halosilanes.

17 Claims, No Drawings

PROCESS FOR CONTINUOUSLY PREPARING LOW-ALKOXY SILICONE RESINS

BACKGROUND OF THE INVENTION

1. Field of the Invention

The invention relates to a process for continuously preparing silicone resins having a low content of alkoxy groups.

2. Background Art

The preparation of silicone resins has been known for some time. Silicone resins are preferably prepared by hydrolysis and condensation of chloro- or alkoxysilanes by means of acid or base catalysis. As an example of an alkoxysilane hydrolysis, reference is made to DE-B 1302773. Compared with chlorosilane hydrolyses, the alkoxysilane hydrolysis reaction is more moderate and are therefore easier to control. However, a disadvantage is a higher cost, since alkoxysilanes are first prepared from the corresponding chlorosilanes.

In addition to the hydrolysis of alkoxysilanes, the hydrolysis of chlorosilanes in particular has become commonplace, since a preceding alkoxylation is not required to prepare alkoxysilanes. Chlorosilane hydrolyses have belonged to the repertoire of silicone resin preparation for some time. As examples of batchwise chlorosilane hydrolyses, reference may be made to GB 1192506, DE 953661 C, DE 854708 C and DE 2415331 A. A disadvantage of these processes is the need for high dilution during the reaction, the reason for which is the high reactivity of the chlorosilanes. A further disadvantage of these processes is the large water excess, which leads to phase separation at the end of the reaction, in the course of which the HCl released is absorbed in the aqueous phase or even neutralized. Viewed on the industrial scale, this firstly results in a large amount of waste which requires disposal, and secondly, the HCl is lost, since it is not economically recoverable.

As examples of a continuous chlorosilane hydrolysis, reference may be made to U.S. Pat. No. 3,489,782 and DE 954198 C. In these references also, a large excess of water is needed, which leads to the wastewater problems mentioned above and the inability to economically recover HCl.

In addition to the classical batchwise and continuous synthesis methods described, technologies using at least one column have become established. These column processes enable a distinctly improved reaction. Thus, no wastewater phases are generated and the HCl released can be recovered as gas at the top of the column. Corresponding processes are described in U.S. Pat. No. 3,792,071 A, U.S. Pat. No. 4,298,753 A, U.S. Pat. No. 6,767,982 B2, U.S. Pat. No. 5,223,636 A1 and U.S. Pat. No. 4,209,454 A1. Even though these processes, compared with batch or loop technology, have been found to be a distinct improvement, they nevertheless have clear limitations which become obvious even in the examples of the documents mentioned. In all processes, only a low degree of condensation of the silicone resins is achieved, so that exclusively alkoxy-rich silicone resins are obtained in all cases. Silicone resins with a high degree of condensation and thus low alkoxy content, for example solid resins as obtained by means of classical batchwise or continuous synthesis methods not containing columns, have not been preparable by these processes to date. However, these products constitute an important constituent of the silicone resin market.

SUMMARY OF THE INVENTION

It is therefore an object of the invention to provide a column process which enables the advantages of a continuous column preparation of silicone resins, even for three-dimensionally crosslinked, low-alkoxy content organopolysiloxane resins. This and other objects are achieved by reacting halosilane with alcohol and water in the presence of the desired organopolysiloxane in a reaction unit comprising a distillation column, optionally a reflux condenser, and a vessel already containing desired organopolysiloxane, by heating the contents of the vessel to boiling under reflux and introducing halosilane to be converted into the column above the lower column end, removing hydrogen halide formed by means of the distillation column, and substantially continuously removing organopolysiloxane from the vessel to the degree in which it is formed. In the process, halosilane, alcohol and water are added continuously to the reaction unit in such amounts that more water is always present in the reaction unit than can be consumed by the added Si-halogen units of the halosilanes.

DETAILED DESCRIPTION OF THE PREFERRED EMBODIMENT(S)

Halosilane, alcohol and water are preferably introduced into the reaction unit in such amounts that at least 1% by weight of water, preferably at least 5% by weight, and most preferably 6-25% by weight of water, based on the total weight of the liquid phase in the vessel, is present in the vessel.

Before the halosilane is introduced into the column, a mixture of alcohol, the desired organopolysiloxane, e.g. an organopolysiloxane which has at least the same number of siloxane units and alkoxy groups as the desired organopolysiloxane, and the amount of water mentioned above is preferably heated to boiling under reflux in the vessel.

The halosilanes may be any halosilane useful for preparing organopolysiloxanes with hydrocarbon radicals bonded to silicon via oxygen by reaction of halosilane with alcohol and water. These are, in particular, compounds of the general formula

$R_n SiX_{4-n}$ in which R are identical or different monovalent atoms, or groups which are inert towards alcohol and water under the particular reaction conditions, X is chlorine or bromine, preferably chlorine, and n is 0, 1, 2 or 3.

Examples of R are hydrogen and monovalent hydrocarbon radicals such as the methyl, ethyl, vinyl, n-propyl, i-propyl, allyl, n-butyl, i-butyl, n-pentyl, i-pentyl, n-hexyl, i-hexyl, cyclohexyl, n-heptyl, n-octyl, i-octyl, hexadecyl, octadecyl, phenyl and tolyl radicals; and also monovalent hydrocarbon radicals substituted by atoms or groups which are inert towards alcohol and water under the particular reaction conditions, in which the carbon atoms to which halogen is bonded are in the alpha position or preferably the gamma position relative to the silicon atom, for example the gamma-chloropropyl radical; and haloaryl radicals, for example chlorophenyl radicals. Further examples of suitable substituted hydrocarbon radicals are the beta-cyanoethyl radical, the gamma-acryloyloxypropyl radical, and the gamma-methacryloyloxypropyl radical.

Preference is given to hydrocarbon radicals such as the methyl, ethyl, vinyl, n-propyl, i-propyl, n-butyl, i-butyl, n-pentyl, i-pentyl, n-hexyl, i-hexyl, cyclohexyl, n-heptyl, n-octyl, i-octyl, hexadecyl, octadecyl, phenyl and tolyl radicals. Particular preference is given to hydrocarbon radicals such as the methyl, vinyl, n-propyl, n-butyl, i-octyl and phenyl radicals. R is most preferably a methyl, n-propyl, vinyl or a phenyl radical.

Preferred halosilanes in the context of the invention are thus tetrachlorosilane, methyltrichlorosilane (MeSiCl$_3$), phenyltrichlorosilane (PhSiCl$_3$), propyltrichlorosilane (PrSiCl$_3$), dimethyldichlorosilane (Me$_2$SiCl$_2$) and trimethylchlorosilane (Me$_3$SiCl). It is possible to use mixtures of different halosilanes. When halosilanes in which n is 3 are used, mixtures of at least one such halosilane and at least one halosilane in which n is 0, 1 or 2 should preferably be used. When halosilanes in which n is 0 are used, mixtures of at least one such halosilane and at least one halosilane in which n is 1, 2 or 3 should preferably be used.

The halosilane may be introduced into the column in liquid or vapor form. It is also possible to introduce different halosilanes in different forms.

The alcohols used may, for example, be any hydrocarbon compound having one alcoholic hydroxyl group which can be used to prepare alkoxysilanes or organopolysiloxanes by reacting chlorosilane with alcohols and optionally water, and whose boiling point is below that of the organopolysiloxanes to be prepared. Preferred alcohols are those of the general formula

R"OH in which R" is a monovalent, aliphatic hydrocarbon radical having from 1 to 8 carbon atoms.

The above-specified examples of aliphatic hydrocarbon radicals R, provided that they contain from 1 to 8 carbon atoms, also apply to the R" radicals with the exception of the vinyl radical. However, preferred R" radicals are alkyl radicals. The hydrocarbon radicals R" may also be substituted by atoms or groups which are inert toward halosilanes and water under the particular reaction conditions. Examples of alcohols usable are methanol, ethanol, n-propanol, isopropanol, n-butanol, isobutanol, tert-butanol, beta-methoxyethanol, n-hexanol and 2-ethylhexanol. It is also possible to use mixtures of different alcohols. Particular preference is given to alkanols and ether oxygen-substituted alkanols having from 1 to 6 carbon atoms, such as methanol, ethanol, beta-methoxyethanol, n-propanol, isopropanol, n-butanol and n-hexanol. Particular preference is given to methanol, ethanol, isopropanol and n-butanol.

It may be appropriate also to include an organic solvent which is unreactive towards the organopolysiloxane. This is necessary in particular when the silicone resin which forms is a solid resin in the cold state. The solvent enables it to be taken up and thus brings about a manageable viscosity of the resin solution. Useful solvents include all classical organic solvents. Preference is given to using unreactive organic solvents, for example toluene or xylene.

The inventive process is preferably carried out at the pressure of the surrounding atmosphere, i.e. at 1 bar or thereabouts, as working under the pressure of the surrounding atmosphere dispenses with the cost and inconvenience for corrosion-resistant pumps. However, if the boiling points of reaction participants requires it or it is otherwise appropriate, it is also possible to work at higher or lower pressures.

The mixture obtained from the first reaction unit described hitherto which contains the desired organopolysiloxane is preferably introduced into a second reaction unit and heated there to a temperature at which the mixture is freed of volatile constituents, which is understood here, predominantly, to mean alcohol, water and HCl, the volatile constituents being recycled from the second reaction unit into the first reaction unit, with organopolysiloxane being constantly drawn off from the bottom of the second reaction unit to the degree to which it is formed. The second reaction unit is preferably likewise a reaction unit comprising a distillation column, optionally a reflux condenser and a vessel already containing the desired organopolysiloxane.

It is important, in accordance with the process of the invention, that halosilane, alcohol and water are always added constantly to the first reaction unit in such amounts that the amount of water present in the reaction units together is always more than can be consumed by the added Si-halogen units of the halosilanes. The volatile constituents from the second reaction unit are recycled into the first reaction unit preferably as a distillate or gas.

An organic solvent unreactive with the desired organopolysiloxane is preferably added to the first or, more preferably, to the second reaction unit. An organic solvent may be added to both units as well.

In the context of the present invention, it has been found that, surprisingly, an excess of water can control condensation during the reaction. The process according to the invention thus allows the utilization of the column process for the preparation of all low-alkoxy silicone resins.

Low-alkoxy silicone resins are understood to mean predominantly silicone resins which have a degree of alkoxylation of not more than 15 mol % residual alkoxy groups based on 100 mol % of the Si—Cl units used, more preferably silicone resins which have a degree of alkoxylation of not more than 10 mol %, yet more preferably not more than 7 mol %, of residual alkoxy groups based on 100 mol % of the Si—Cl units used.

The hydrogen halide formed in the first reaction unit in the reaction is preferably freed at the top of reaction unit 1. The condensable constituents are thus available as a gas for recovery which are in turn preferably returned to the reaction unit.

The excess of water in the reaction chamber should preferably be established such that water is added in excess as early as in the course of charging of the units before the start of the continuous reaction. The water content is preferably kept subsequently constant, for example by adding an amount of water continuously to the degree to which it is consumed by the hydrolysis. The water can be added directly to the first or else to the second reaction unit, since volatile constituents of the second reaction unit are recycled into the first reaction unit. Preference is given to metering the water into the first reaction unit.

Alternatively, the water excess in the reaction system can be attained by metering more water in at the start of the continuous reaction than is consumed by the added SiCl units until the necessary water excess is present in the system.

To control the reaction unit, alcohol is used. The amount metered in continuously depends on the degree to which it is consumed to form the residual alkoxy groups remaining on the silicone resin formed. The alcohol can likewise be added to both reaction units, but is preferably added to reaction unit 1.

The column used in the process according to the invention may be any tubular reactor, preferably one which is provided with random packings or internals and may also be used for fractionation in a fractional distillation, for example a column with random packing. There is no crucial upper limit for the column length. When the column is too short to ensure sufficient reflux within the column, it is of course also necessary to equip it with a condensation unit (for example a reflux condenser). The vessel may be configured, for example, as a still, evaporation flask, bottom evaporator, or preferably, a circulation evaporator.

The column-containing reaction unit 1 preferably consists of a column with a circulation evaporator. For the second reaction unit, any heatable unit which enables volatile constituents to be removed is useable in principle, in order to conduct these constituents back into the first reaction unit. Preference is given to using units which likewise comprise a column, the reaction mixture of the first reaction unit appropriately being introduced as close as possible to the top of the second reaction column. More preferably, the second reaction unit is a column with a circulation evaporator.

Since the first reaction unit generally contains the greatest proportion of water, the bottoms of the first reaction unit may, at times, be a biphasic mixture. In order not to introduce a water phase into the second reaction unit from the bottoms of reaction unit 1, preference is given to conducting a phase separation between the two reaction units. Often, merely a calming zone is sufficient for phase separation between the reaction units, but any phase separation process is useable in principle. Preference is given to a phase separation based on coalescer units.

The temperature in reaction unit 1 is preferably lower than 100° C. The temperature in the second reaction unit is higher than the temperature in the first reaction unit, but, in the case of the presence of a solvent, preferably not higher than its boiling point.

The silicone resins or silicone resin solutions obtained from the second reaction unit are already very low in HCl, so that they are storage-stable over a number of days both as a pure substance and as a resin solution. The invention thus also relates to low-alkoxy silicone resins which have been prepared by means of a process according to the invention.

The silicone resins obtainable in accordance with the invention are suitable for all applications known for silicone resins. Examples of such applications are binders, mainly in coatings or as electrical insulation, or as the release force regulator in release paper coating. In the case of silicone resin solutions, further workup can be effected either batchwise or continuously. Owing to the particular preparation, preference is given to a continuous workup, on the industrial scale, for example, by means of a thin-film evaporator.

The examples which follow serve to further illustrate the invention. In the examples, an apparatus consisting of two reaction units is used. Both reaction units consist of a circulation evaporator with a capacity of 2.5 l and a 5 m column with an internal width of 50 mm attached thereto. The column of the first reaction unit has, at the top, first a water-operated cooler and then a brine-operated cooler. The condensates obtained there are fed back into the column of the first reaction unit. The hydrogen chloride gas present downstream of the coolers can be recovered. The column of the second reaction unit has, at the top, a water-operated cooler. The volatile constituents condensed there, including any gas, are recycled into the lower third of the column of the first reaction unit.

From the circulation evaporator of the first reaction unit, as much reaction mixture is discharged continuously by means of a centrifugal pump as is obtained by the reaction and the distillate recycling. The reaction mixture from the circulation evaporator of the first reaction unit is introduced at the top, directly below the condensation unit of the second column. From the circulation evaporator of the first reaction unit, product is likewise removed by means of a centrifugal pump to the degree to which it is formed.

EXAMPLE 1

The 2.5 l circulation evaporator of the first reaction unit is charged as follows: 1700 ml of a 50% solution of the desired silicone resin in toluene, 250 ml of ethanol, and 450 g of water. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is begun as follows: 3 m below the top of the column, $PhSiCl_3$ is fed in at 1050 g/h. Just above the circulation evaporator, 148 g of water and ethanol are fed in to such a degree (typically: approximately 70 ml/h) that a constant temperature profile of 63-79° C., depending on the measurement point, is obtained in the column.

In the bottom of the column, there is a temperature of approximately 87° C. The crude product is withdrawn constantly from the circulation evaporator to the degree to which it is formed and fed to the top of reactor 2 below the condensation unit.

The temperature in the column of reactor 2 is kept at approximately 105-109° C. The temperature in the circulation evaporator of reactor 2 is approximately 107° C. The condensate reflux from reactor unit 2 into reactor unit 1 is approximately 1 m above the circulation evaporator of reaction unit 1. Approximately 1 m above the circulation evaporator of reaction unit 2,900 ml/h of toluene are metered in to take up the silicone resin, which is solid at room temperature.

From the circulation evaporator of reactor 2, a clear resin solution which contains approximately 6 ppm of HCl and has a solids content of 47% by weight is removed continuously. Owing to the low HCl content, this resin solution thus obtained can be further processed directly or stored. The high solids content of the resin solution should be noted.

To determine resin quality, the crude solution was freed of solvent under reduced pressure on a rotary evaporator. The analysis of the resulting solid resin gave a softening point of 77° C., an OH content of 4.9% by weight, a degree of alkoxylation of 2.1 mol % of residual alkoxy groups based on 100 mol % of the Si—Cl units used, and a molecular weight Mw of 1300 g/mol.

COMPARATIVE EXAMPLE 1

The 2.5 l circulation evaporator of the first reaction unit is charged as follows: 2250 ml of a 50% solution of the desired silicone resin in toluene, and 250 ml of ethanol. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is started as follows: 3 m below the top of the column, $PhSiCl_3$ is fed in at 1050 g/h. Just above the circulation evaporator, 148 g of water and ethanol are fed in to such a degree (typically: approximately 100 ml/h) that a constant temperature profile of 70-78° C., depending on the measurement point, is obtained in the column.

In the bottom of the column, there is a temperature of between 80° C. and 82° C. The crude product is withdrawn constantly from the circulation evaporator to the degree to which it is formed and fed to the top of reactor 2 below the condensation unit.

The temperature in the column of reactor 2 is kept at approximately 106-109° C. The temperature in the circulation evaporator of reactor 2 is approximately 112° C. The condensate reflux from reactor unit 2 into reactor unit 1 is approximately 1 m above the circulation evaporator of reaction unit 1. Approximately 1 m above the circulation evaporator of reaction unit 2,900 ml/h of toluene are metered in to take up the silicone resin, which is solid at room temperature.

From the circulation evaporator of reactor 2, a resin solution which is very cloudy, even at the start, is removed continuously. During the reaction, deposits become visible after only a few minutes and led, owing to gel formation/silica formation, to the termination of the reaction after only 15 minutes. The resulting reaction solution was very cloudy with solid precipitates and gel particles.

EXAMPLE 2

The 2.5 l circulation evaporator of the first reaction unit is charged as follows: 1900 ml of a 50% solution of the desired silicone resin in toluene, 250 ml of ethanol, 300 g of water. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is started as follows: 3 m below the top of the column, 1400 g/h of a silane mixture consisting of $PhSiCl_3$ and $PrSiCl_3$ in a molar ratio of $PhSiCl_3/PrSiCl_3=2/1$ are fed in. Just above the circulation evaporator, 195 g of water and ethanol (typically: approximately 60 ml/h), are fed in to such a degree that a constant temperature profile of 50-85° C., depending on the measurement point is obtained in the column.

In the bottom of the column, there is a temperature of approximately 85° C. The crude product is withdrawn constantly from the circulation evaporator to the degree to which it is formed and fed to the top of reactor 2 below the condensation unit.

The temperature in the column of reactor 2 is kept at approximately 87-104° C. depending on the measurement point. The temperature in the circulation evaporator of reactor 2 is approximately 104° C. The condensate reflux from reactor unit 2 into reactor unit 1 is approximately 1 m above the circulation evaporator of reaction unit 1. Approximately 1 m above the circulation evaporator of reaction unit 2,820 ml/h of toluene are metered in to take up the silicone resin, which is solid at room temperature.

From the circulation evaporator of reactor 2, a clear resin solution which contains approximately 8 ppm of HCl and has a solids content of 52% by weight is removed continuously. Owing to the low HCl content, this clear resin solution thus obtained can be further processed directly, or stored. The high solids content should be noted.

To determine resin quality, the crude solution was freed of solvent under reduced pressure on a rotary evaporator. The analysis of the resulting solid resin gave a softening point of 48° C., an OH content of 3.2% by weight, a degree of alkoxylation of 2.7 mol % of residual alkoxy groups based on 100 mol % of the Si—Cl units used, and a molecular weight Mw of 2500 g/mol.

COMPARATIVE EXAMPLE 2

The 2.5 l circulation evaporator of the first reaction unit is charged as follows: 2200 ml of a 50% solution of the desired silicone resin in toluene, and 250 ml of ethanol. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is started as follows: 3 m below the top of the column, 1400 g/h of a silane mixture consisting of $PhSiCl_3$ and $PrSiCl_3$ in a molar ratio of $PhSiCl_3/PrSiCl_3=2/1$ are fed in. Just above the circulation evaporator, 195 g of water and ethanol are fed in to such a degree, (typically: approximately 50 ml/h), that a constant temperature profile of 50-77° C., depending on the measurement point, is obtained in the column.

In the bottom of the column, there is a temperature of approximately 85° C. The crude product is withdrawn constantly from the circulation evaporator to the degree to which it is formed and fed to the top of reactor 2 below the condensation unit.

The temperature in the column of reactor 2 is kept at approximately 90-106° C. depending on the measurement point. The temperature in the circulation evaporator of reactor 2 is approximately 105° C. The condensate reflux from reactor unit 2 into reactor unit 1 is approximately 1 m above the circulation evaporator of reaction unit 1. Approximately 1 m above the circulation evaporator of reaction unit 2,820 g/h of toluene are metered in to take up the silicone resin, which is solid at room temperature.

From the circulation evaporator of reactor 2, a very cloudy resin solution is removed continuously. During the reaction, deposits become visible after only a few minutes and led, owing to gel formation/silica formation, to the termination of the reaction after only 30 minutes. The resulting reaction solution was very cloudy with solid precipitates and gel particles.

EXAMPLE 3

The 2.5 l circulation evaporator of the first reaction unit is charged as follows: 1700 ml of a 50% solution of the desired silicone resin in toluene, 200 ml of ethanol, and 500 g of water. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is started as follows: 3 m below the top of the column, 950 g/h of a silane mixture consisting of $PhSiCl_3$, $MeSiCl_3$ and $Me_2SiCl_2$ in a molar ratio of $PhSiCl_3/MeSiCl_3/Me_2SiCl_2=55/40/5$ are fed in. Just above the circulation evaporator, 140 g of water and ethanol are fed in to such a degree, (typically: approximately 60 ml/h), that a constant temperature profile of 65-74° C., depending on the measurement point, is obtained in the column.

In the bottom of the column, there is a temperature of approximately 81° C. The crude product is withdrawn constantly from the circulation evaporator to the degree to which it is formed and fed to the top of reactor 2 below the condensation unit.

The temperature in the column of reactor 2 is kept at approximately 97-105° C. depending on the measurement point. The temperature in the circulation evaporator of reactor 2 is approximately 108° C. The condensate reflux from reactor unit 2 into reactor unit 1 is approximately 1 m above the circulation evaporator of reaction unit 1. Approximately 1 m above the circulation evaporator of reaction unit 2,700 ml/h of toluene, and, approximately 1 m above the circulation evaporator of reaction unit 1,400 ml/h of toluene, are metered in to take up the silicone resin, which is solid at room temperature.

From the circulation evaporator of reactor 2, a clear resin solution which contains approximately 10 ppm of HCl and has a solids content of 43% by weight is removed continuously. Owing to the low HCl content, this clear resin solution thus obtained can be further processed directly, or stored. The high solids content of the resin solution should be noted.

To determine resin quality, the crude solution was freed of solvent under reduced pressure on a rotary evaporator. The analysis of the resulting solid resin gave a softening point of 56° C., an OH content of 2.0% by weight, a degree of alkoxylation of 4.2 mol % of residual alkoxy groups based on 100 mol % of the Si—Cl units used, and a molecular weight Mw of 3600 g/mol.

EXAMPLE 4

The 2.5 l circulation evaporator of the first reaction unit is charged as follows: 1700 ml of a 50% solution of the desired silicone resin in toluene, 200 ml of methanol, 500 g of water. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, the continuous metering is started as follows: 3 m below the top of the column, 950 g/h of a silane mixture consisting of $PhSiCl_3$, $MeSiCl_3$ and $Me_2SiCl_2$ in a molar ratio of $PhSiCl_3/MeSiCl_3/Me_2SiCl_2$=55/40/5 are fed in. Just above the circulation evaporator, 143 g of water and methanol are fed in to such a degree, (approximately 50 ml/h), that a constant temperature profile of 52-62° C., depending on the measurement point is obtained in the column.

In the bottom of the column, there is a temperature of approximately 68° C. The crude product is withdrawn constantly from the circulation evaporator to the degree to which it is formed and fed to the top of reactor 2 below the condensation units.

The temperature in the column of reactor 2 is kept at approximately 91-105° C. depending on the measurement point. The temperature in the circulation evaporator of reactor 2 is approximately 107° C. The condensate reflux from reactor unit 2 into reactor unit 1 is approximately 1 m above the circulation evaporator of reaction unit 1. Approximately 1 m above the circulation evaporator of reaction unit 2, 700 ml/h of toluene, and, approximately 1 m above the circulation evaporator of reaction unit 1, 400 ml/h of toluene, are metered in to take up the silicone resin, which is solid at room temperature.

From the circulation evaporator of reactor 2, a clear resin solution which contains approximately 11 ppm of HCl and has a solids content of 44% by weight is removed continuously. Owing to the low HCl content, this clear resin solution thus obtained can be further processed directly, or stored. The high solids content is noted.

To determine resin quality, the crude solution was freed of solvent under reduced pressure on a rotary evaporator. The analysis of the resulting solid resin gave a softening point of 67° C., an OH content of 1.5% by weight, a degree of alkoxylation of 2.6 mol % of residual alkoxy groups based on 100 mol % of the Si—Cl units used, and a molecular weight Mw of 2500 g/mol.

EXAMPLE 5

The 2.5 l circulation evaporator of the first reaction unit is charged as follows: 1900 ml of a 50% solution of the desired silicone resin in toluene, 250 ml of ethanol, 450 g of water. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is started as follows: 3 m below the top of the column, 900 g/h of a silane mixture consisting of $SiCl_4$ and $Me_3SiCl$ in a molar ratio of $SiCl_4/Me_3SiCl$=60/40 are fed in. Just above the circulation evaporator, 156 g of water and ethanol are fed in to such a degree, (typically: approximately 60 ml/h), that a constant temperature profile of 58-74° C., depending on the measurement point is obtained in the column.

In the bottom of the column, there is a temperature of approximately 81° C. The crude product is withdrawn constantly from the circulation evaporator to the degree to which it is formed and fed to the top of reactor 2 below the condensation units.

The temperature in the column of reactor 2 is kept at approximately 90-105° C. The temperature in the circulation evaporator of reactor 2 is approximately 108° C. The condensate reflux from reactor unit 2 into reactor unit 1 is approximately 1 m above the circulation evaporator of reaction unit 1. Approximately 1 m above the circulation evaporator of reaction unit 2, 485 ml/h of toluene are metered in to take up the silicone resin which is solid at room temperature.

From the circulation evaporator of reactor 2, a clear resin solution which contains approximately 4 ppm of HCl and has a solids content of 45% by weight is removed continuously. Owing to the very low HCl content, the clear resin solution thus obtained can be further processed directly or stored. The high solids content is noted.

To determine resin quality, the crude solution was freed of solvent under reduced pressure on a rotary evaporator. The analysis of the resulting solid resin gave an OH content of 1.2% by weight, a degree of alkoxylation of 2.5 mol % of residual alkoxy groups based on 100 mol % of the Si—Cl units used, and a molecular weight Mw of 2500 g/mol.

The resulting resin solution may also be aftertreated under basic conditions with known methods customary in MQ resin synthesis. The basic aftertreatment is effected directly starting from the 45% resin solution using 450 ppm of NaOH. The solid resin obtained therefrom has an OH content of 0.19% by weight, a degree of alkoxylation of 1.2 mol % of residual alkoxy groups based on 100 mol % of the Si—Cl units used, and a molecular weight Mw of 7500 g/mol.

EXAMPLE 6

The 2.5 l circulation evaporator of the first reaction unit is charged as follows: 1900 ml of a 50% solution of the desired silicone resin in toluene, 250 ml of ethanol, 450 g of water. The 2.5 l circulation evaporator of the second reaction unit is charged with 2.5 l of a 50% solution of the desired silicone resin in toluene.

The reaction units are heated by means of the circulation evaporator until a stable distillation equilibrium in the columns is attained. Subsequently, continuous metering is started as follows: 3 m below the top of the column, 900 g/h of a silane mixture consisting of $SiCl_4$, (Vi=vinyl) $ViMe_2SiCl$ and $Me_3SiCl$ in a molar ratio of $SiCl_4/ViMe_2SiCl/Me_3SiCl$=50/5/45 are fed in. Just above the circulation evaporator, 145 g of water and ethanol are fed in to such a degree, (typically: approximately 50 g/h), that a constant temperature profile of 56-78° C. is obtained in the column. In the bottom of the column, there is a temperature of 82° C. The crude product is withdrawn constantly from the circulation evaporator to the degree to which it is formed and fed to the top of reactor 2 below the condensation units.

The temperature in the column of reactor 2 is kept at approximately 93-106° C. The temperature in the circulation evaporator of reactor 2 is approximately 107° C. The condensate reflux from reactor unit 2 into reactor unit 1 is approximately 1 m above the circulation evaporator of reaction unit 1. Approximately 1 m above the circulation evaporator of reaction unit 2,500 g/h of toluene are metered in to take up the silicone resin which is solid at room temperature.

From the circulation evaporator of reactor 2, a clear resin solution which contains approximately 8 ppm of HCl and has a solids content of 46% by weight is removed continuously. Owing to the low HCl content, the clear resin solution thus obtained can be further processed directly or stored. The high solids content is noted.

To determine resin quality, the crude solution was freed of solvent under reduced pressure on a rotary evaporator. The analysis of the resulting solid resin gave an OH content of 1.7% by weight, a degree of alkoxylation of 2.6 mol % of residual alkoxy groups based on 100 mol % of the Si—Cl units used, and a molecular weight Mw of 1800 g/mol.

The resulting resin solution may also be aftertreated under basic conditions with known methods customary in MQ resin synthesis. The basic aftertreatment is effected directly starting from the 46% resin solution using 450 ppm of NaOH. The solid resin obtained therefrom has an OH content of 0.15% by weight, a degree of alkoxylation of 1.4 mol % of residual alkoxy groups based on 100 mol % of the Si—Cl units used, an iodine number of 18.2, and a molecular weight Mw of 6850 g/mol.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing a defined organopolysiloxane product, comprising reacting halosilane with alcohol and water in the presence of the defined organopolysiloxane in a first reaction unit comprising a distillation column, optionally a reflux condenser, and a vessel already containing previously prepared defined organopolysiloxane which has at least the same number of siloxane units and alkoxy group as the defined organopolysiloxane product, said previously prepared organopolysiloxane being present in said vessel prior to said reacting of halosilane with alcohol and water, heating the contents of the vessel to boiling under reflux and introducing halosilane to be reacted into the column above the lower column end, removing hydrogen halide formed from the distillation column, and removing organopolysiloxane from the vessel continuously to a degree in which it is formed, wherein halosilane, alcohol and water are added continuously to the first reaction unit in such amounts that more water is always present in the reaction unit than is consumed by the added Si-halogen units of the halosilanes.

2. The process of claim 1, wherein halosilane, alcohol and water are introduced into the reaction unit in such amounts that at least 1% by weight of water, based on the total weight of the liquid phase in the vessel, is present in the vessel.

3. The process of claim 2, wherein, before halosilane to be reacted is introduced into the column, a mixture of the previously prepared defined organopolysiloxane, water, and alcohol is heated to boiling under reflux in the vessel.

4. The process of claim 1, wherein halosilane, alcohol and water are introduced into the reaction unit in such amounts that at least 5% by weight of water, based on the total weight of the liquid phase in the vessel, is present in the vessel.

5. The process of claim 4, wherein, before halosilane to be reacted is introduced into the column, a mixture of the previously prepared defined organopolysiloxane, water, and alcohol is heated to boiling under reflux in the vessel.

6. The process of claim 1, wherein halosilane, alcohol and water are introduced into the reaction unit in such amounts that at least 6-25% by weight of water, based on the total weight of the liquid phase in the vessel, is present in the vessel.

7. The process of claim 1, wherein, before halosilane to be reacted is introduced into the column, a mixture of the previously prepared defined organopolysiloxane, water, and alcohol is heated to boiling under reflux in the vessel.

8. The process of claim 1, wherein at least one halosilane is a compound of the formula

$$R_nSiX_{4-n}$$

in which each R independently is an identical or different, monovalent atom or group of atoms which is inert toward alcohol and water under the reaction conditions, X is chlorine or bromine, and n is 0, 1, 2 or 3.

9. The process of claim 1, wherein the alcohol is a compound of the formula

$$R''OH$$

in which R" is a monovalent, aliphatic hydrocarbon radical having from 1 to 8 carbon atoms.

10. The process of claim 1, wherein a resulting mixture comprising the defined organopolysiloxane product is introduced into a second reaction unit and heated there to a temperature at which volatile constituents are removed from the second reaction unit, the volatile constituents being recycled from the second reaction unit into the first reaction unit and organopolysiloxane being constantly drawn off from the bottom of the second reaction unit to the degree in which the organopolysiloxane is formed.

11. The process of claim 10, wherein an inert solvent is present in said second reaction unit.

12. The process of claim 1, wherein an organic solvent unreactive with the organopolysiloxane is additionally present.

13. The process of claim 1, wherein the temperature in the first reaction unit is lower than 100° C.

14. The process of claim 1, wherein the organopolysioxane product has a degree of alkoxylation of not more than 15 mol % alkoxy groups based on 100 mol % of silicon-bonded chlorine present in the halosilane introduced into the first reaction unit.

15. The process of claim 1, wherein the organopolysioxane product has a degree of alkoxylation of not more than 10 mol % alkoxy groups based on 100 mol % of silicon-bonded chlorine present in the halosilane introduced into the first reaction unit.

16. The process of claim 1, wherein the organopolysioxane product has a degree of alkoxylation of not more than 7 mol % alkoxy groups based on 100 mol % of silicon-bonded chlorine present in the halosilane introduced into the first reaction unit.

17. The process of claim 1, wherein the organopolysioxane product has a low content of HCl directly as removed from the process, such that the organopolysioxane or solution thereof is storage-stable.

* * * * *

UNITED STATES PATENT AND TRADEMARK OFFICE
CERTIFICATE OF CORRECTION

| | |
|---|---|
| PATENT NO. | : 7,514,518 B2 |
| APPLICATION NO. | : 11/333713 |
| DATED | : April 7, 2009 |
| INVENTOR(S) | : Wolfgang Schattenmann et al. |

It is certified that error appears in the above-identified patent and that said Letters Patent is hereby corrected as shown below:

Column 11, Line 44, Claim 1:

Delete "group" and insert -- groups --.

Signed and Sealed this

Second Day of June, 2009

JOHN DOLL
*Acting Director of the United States Patent and Trademark Office*